Sept. 16, 1969
L. H. WHITE
3,467,553
FUEL CELL CONSTRUCTION WITH INVOLUTE REACTANT
FLOW DIRECTING MEANS
Filed June 29, 1966
2 Sheets-Sheet 2
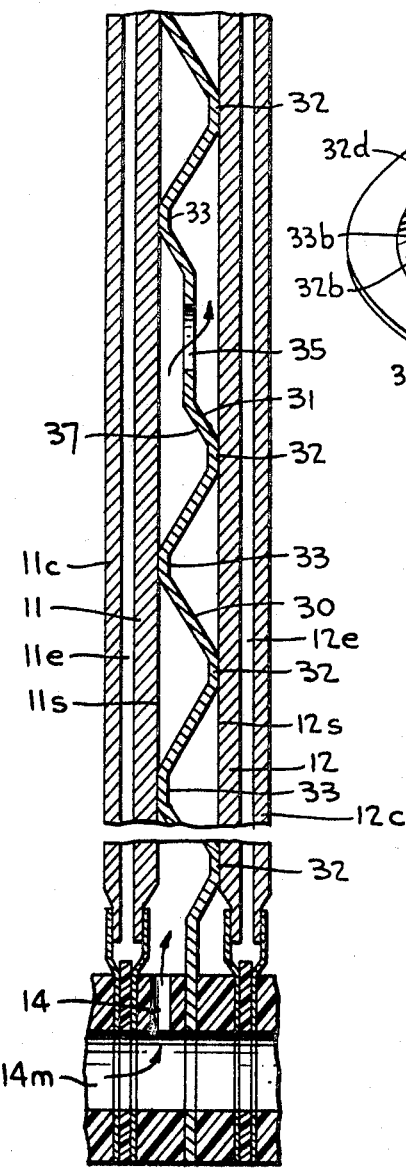
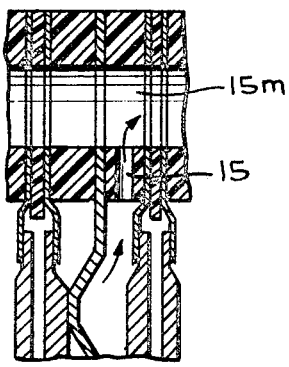
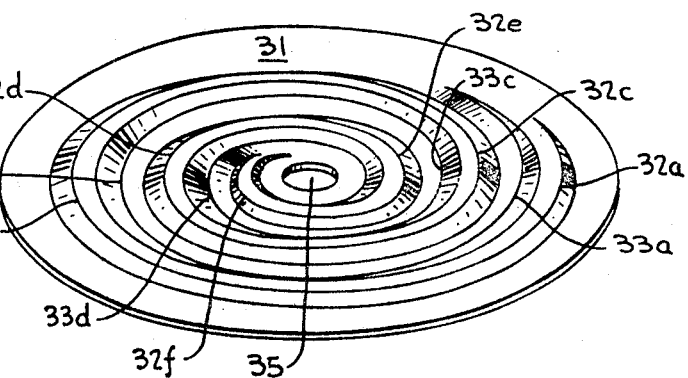
INVENTOR,
LOREN H. WHITE United States Patent Office 3,467,553
Patented Sept. 16, 1969

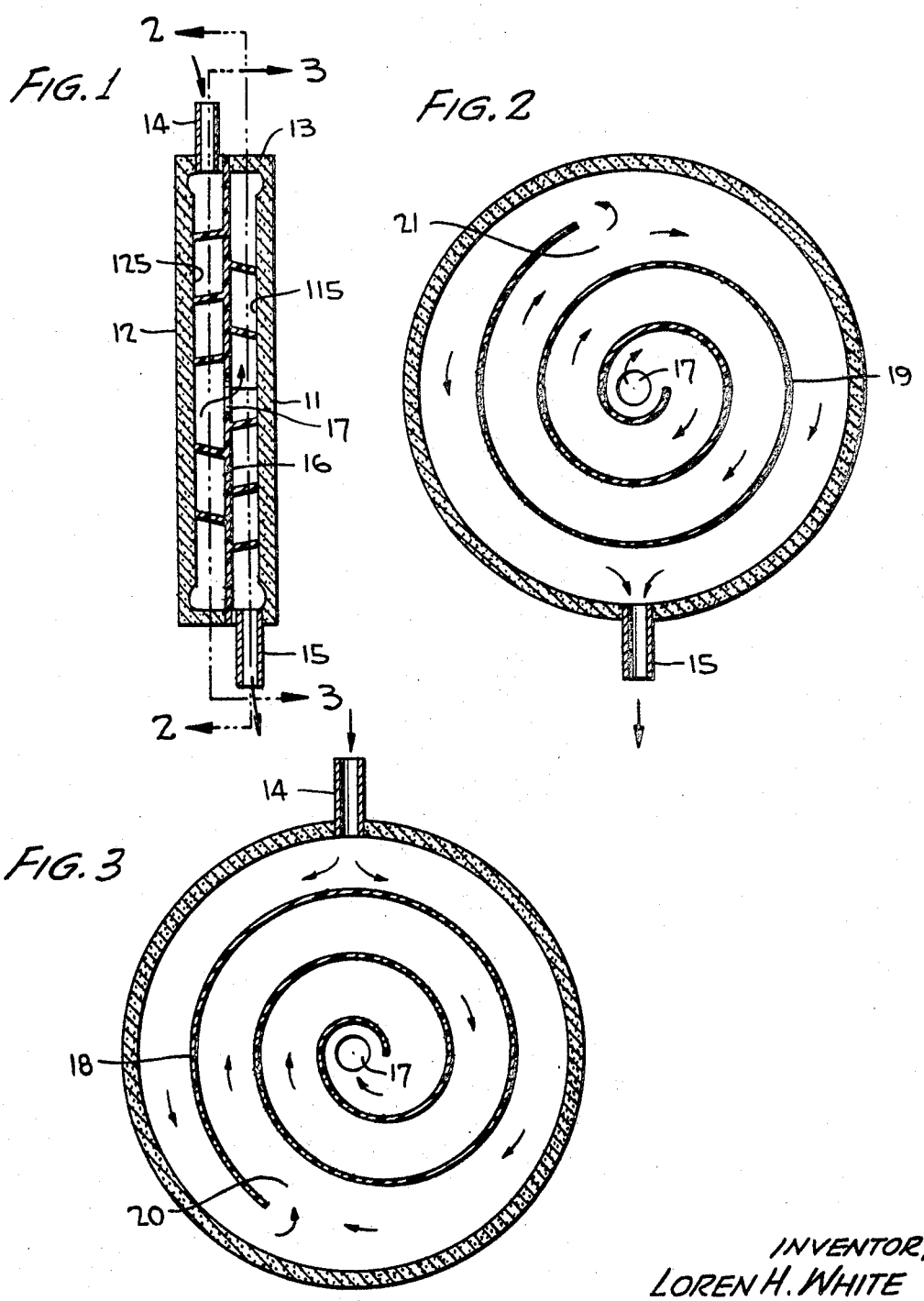

3,467,553
FUEL CELL CONSTRUCTION WITH INVOLUTE
REACTANT FLOW DIRECTING MEANS
Loren H. White, East Hartford, Conn., assignor, by mesne assignments, to Leesona Corporation, Warwick, R.I., a corporation of Massachusetts
Filed June 29, 1966, Ser. No. 561,484
Int. Cl. H01m 27/12
U.S. Cl. 136—86                                        14 Claims

ABSTRACT OF THE DISCLOSURE

An electrode structure is described comprising a pair of spaced electrodes constructed and arranged to define a reaction chamber therebetween and includes a flow divider disposed within said chamber and cooperating with at least one of the electrodes to define an involute flow path past the electrodes.

---

This invention relates to a novel construction of electrochemical devices such as fuel cells, and more particularly to a novel construction of that portion of the electrochemical device which serves to circulate fluid reactants to the electrodes thereof.

Fuel cells produce electricity directly from a fuel and an oxidant, converting the free energy released in a suitable chemical reaction directly to electrical energy, without the need for an intermediary conversion of the energy into heat and/or mechanical energy.

Electrical energy is produced in these devices by the free energy-producing chemical reaction occurring at the triple interface between the reactant, the electrolyte and a catalyst which is in electrically conductive contact with the external electrical circuit energized by the cell. Such an interface is maintained at each anode and cathode of the cell, the cathode reactant being an oxidant and the anode reactant being a fuel.

One type of fuel cell to which the instant invention is applicable is disclosed in U.S. Patent 3,253,953 to Turner et al., in which a plurality of pairs of electrodes are assembled for interconnection and joint operation in the form of stacks. In this kind of an arrangement, alternate pairs of electrodes are generally "reversed," so that the anodes from two adjacent electrode pairs will each face a common space through which fuel can be supplied to both, and so that, similarly, the cathodes from two other adjacent electrode pairs can be supplied with oxidant through a common space. Thus, two anodes from adjacent electrode pairs in the fuel cell assembly will each present their fuel absorbing surfaces to a fuel supply chamber. Fuel is constantly circulated into and through this supply chamber. Inasmuch as both heat and mass transfer occurs across the surfaces of the electrodes facing this fuel supply chamber while the fuel cell is in operation, it is desirable that flow of the fuel be constantly and uniformly maintained past all sections of this surface at all times during operation.

It is an object of this invention to provide a reactant supply chamber for like electrodes of adjacent fuel cells which provide for a uniform flow rate of reactant past all portions of the reactant-absorbing surfaces of the adjacent electrodes.

It is another object of this invention to provide for such flow rates with a minimum of pressure drop due to frictional drag.

It is a further object of this invention to provide for uniform heat and mass transfer across the surfaces of the electrodes adjacent to said supply chamber, this uniformity remaining unaffected by leakage which may occur in the structure.

The manner in which the instant invention accomplishes these and other objectives will become apparent from a consideration of this specification when taken together with the accompanying drawings, in which:

FIGURE 1 is a cross-section of a portion of a fuel cell with a reactant supply chamber which represents one embodiment of the instant invention;

FIGURE 2 is a cross-sectional view along section line 2—2 of FIGURE 1;

FIGURE 3 is a cross-sectional view along section line 3—3 of FIGURE 1;

FIGURE 4 is a broken cross-section of a portion of a fuel cell with a reactant supply chamber which represents another embodiment of the instant invention; and FIGURE 5 is an isometric representation of the flow divider, isolated from its surroundings, in the reactant supply chamber of the embodiment of the invention shown in FIGURE 4.

Although the instant invention will be described in this specification as it applies to a fuel supply chamber bordered by disc-shaped, i.e. circular, electrodes, those skilled in this art will readily recognize how the invention is applied to fuel cells wherein the electrodes are other than circular in shape. Also, it will be understood that while this description will be of a supply chamber for fuel being fed to the anode of two adjacent electrode pairs, the invention is equally applicable for a chamber supplying oxidant to cathodes of adjacent electrode pairs.

According to the instant invention the fuel is circulated from the entrance port to the fuel supply chamber around the periphery of the reactant-absorbing surface of one electrode and then along an involute flow path toward the center thereof whence it follows an involute flow path along the reactant-absorbing surface of the other electrode and about the periphery thereof before the excess reactant (i.e. that portion whichi s not absorbed) is discharged through the reactant vent port. The reactant flows past virtually all portions of each of the electrodes at the same volumetric flow rate. Even if there is internal leakage from one portion of the flow path to another across the flow dividers provided in the fuel supply chamber, this will tend to be balanced and symmetrical so that the net flow will nevertheless be uniform in rate.

One embodiment of this invention will now be described with reference first to FIGURE 1. The outer confines of the reactant distribution chamber are defined by the reactant absorbing surfaces $11s$ and $12s$ of electrodes 11 and 12 respectively and by cylindrical means 13 which surround the entire fuel cell assembly. Reactant inlet 14 and reactant outlet 15 are conveniently disposed at opposite ends of the chamber. A disc-shaped central flow divider 16 bisects the chamber longitudinally and permits no flow between the two halves of the chamber thus formed except through the central opening 17 therein. This central opening 17 may conveniently be a circular hole of a diameter equal to the diameter of the inlet or outlet ports, but may be larger or smaller than either of these.

It is essential for the successful operation of this invention that outlet port 15 be located in the chamber on the side of central flow divider 16 which is opposite to that of the location of reactant inlet port 14.

As can best be seen in FIGURES 2 and 3 the two halves of the reactant supply chamber created by central flow divider 16 are further subdivided by involute flow dividers 18 and 19 which are, for optimum results, each in the shape of a Spiral of Archimedes (a curve describing the function $r=a\theta$, wherein $r$ and $\theta$ are the polar coordinates of any point on the curve and $a$ is an arbitrary constant.)

As shown in FIGURE 3 the optimum orientation for the involute flow divider 18 is such that the peripheral entrance 20 to the involute is located as remotely as possible, i.e., at the opposite end of the chamber from, reactant inlet 14. This assures that entering reactant will flow in a divided path past the radially outermost portions of electrode surface 12s before entering the involute opening 20. The reactant then flows inwardly through the involute passes through the opening 17 in the central flow divider and thence outwardly through the involute flow divider 19 on the other side of the chamber. Here again, the best effect is achieved if the opening 21 of the involute flow divider is located as remotely as possible from the reactant outlet 15.

Instead of being single pitched as shown in FIGURES 2 and 3, the involute flow divider can be of multiple, i.e. double, triple, etc., pitch. Thus, if the configuration of the involute flow divider is that of a spiral it may be a double, triple or higher pitch spiral. In that case it may be best to stagger the openings (analogous to 20 and 21) of the respective involute dividers so that they are symmetrically arranged about the ports 14 or 15. It may also be desirable to bias the port 14 or 15 so as to secure uniform flow.

In the embodiment shown in FIGURES 1–3, the involute flow divider in one side of the chamber has a configuration which is the enantiomorph of that in the other chamber. That is, if the involute flow divider in the lefthand chamber is a lefthand spiral, that in the righthand chamber is a righthand spiral. This strengthens the structure to resist wrinkling or crushing of the flow divider.

In the embodiment depicted in FIGURES 4 and 5, the need to provide separate central and involute flow dividers is obviated. A single flow divider 30 is formed in the shape indicated in FIGURE 5 by any convenient means such as molding, stamping, machining and the like. The face 31 of this flow divider 30 which faces upward in FIGURE 5 contains an involute ridge, the path of which is indicated as 32a–f, and an involute valley, the path of which is indicated as 33a–e. These involute paths connect the periphery of the divider 30 with the central hole 35 therein. The other side 37 (FIGURE 5) of the flow divider is the "negative" of side 31. That is, opposite each ridge on face 31 of the divider there is a valley on face 37, and opposite each valley on face 31 there is a ridge on face 37.

FIGURE 4 indicates the manner of operation of this embodiment. Fuel enters the chamber at port 14 and is directed by flow divider 30 about the periphery of reactant-absorbing surface 11s of electrode 11. Then the fuel follows an involute path until it reaches central opening 35, whence it contacts reactant-absorbing surface 12s of electrode 12 along an involute path ending at its periphery and finally leaves the chamber through port 15. FIGURE 4 also indicates the structure of the remainder of the fuel cell. Thus if electrodes 11 and 12 are anodes from adjacent electrode pairs, 11c and 12c are the cathodes of those respective pairs and 11e and 12e are the electrolyte space of those respective pairs. Fuel supply manifold 14m connects the supply ports of all of the fuel supply chambers such as the one shown in the stack with the fuel supply and fuel vent manifold 15m similarly connects the fuel vents 15.

The advantage of the integral flow divider of this embodiment, aside from ease of fabrication and assembly, is that it will be particularly resistant to crushing or deformation in the fuel cell assembly. As in the other embodiment described, the involutions may be in the form of a Spiral of Archimedes. Also multiple pitch involutions may be used.

I claim:

1. An electrode structure comprising a pair of spaced electrodes constructed and arranged to define a closed reactant supply chamber and a flow divider disposed within said chamber and separating said chamber into two compartments and cooperating with at least one of said electrodes throughout substantially its entire extent constructed and arranged to define an involute flow path past said one electrode surface from reactant inlet port to reactant vent and means providing communication with each of said compartments.

2. The structure of claim 1 wherein the electrodes and central flow divider are disc-shaped.

3. A pair of electrodes constructed and arranged to partially define a closed chamber therebetween, and a flow divider disposed between said electrodes, said flow divider comprising a longitudinal flow divider having an aperture substantially in the center thereof, said longitudinal flow divider separating said chamber into two compartments communicating with each other only through said central aperture, said central flow divider being located so that the reactant inlet port to said chamber communicates with one of said compartments and the reactant outlet port with the other, and involute flow dividing means on each side of said longitudinal flow dividing means whereby each of said compartments presents an involute path between the said central aperture and the reactant port communicating with that compartment.

4. The structure of claim 3 wherein said two compartments are of substantially equal volume.

5. The structure of claim 3 wherein said central flow dividing means and said electrodes are all substantially parallel to each other.

6. The structure of claim 3 wherein said involute flow dividing means are Spirals of Archimedes.

7. The structure of claim 3 wherein said involute flow dividing means are enantiomorphic.

8. The structure of claim 6 wherein said spiral flow dividing means are enantiomorphic.

9. The structure of claim 3 wherein said involute flow dividing means are oriented to present an involute flow path the entrance to which is in that portion of the said compartment most remote from the point of entry of the reactant port communicating therewith.

10. A pair of electrodes constructed and arranged to partially define a reactant supply chamber for said electrodes comprising a volume bounded by the reactant-absorbing surfaces of said electrodes and a circumferential member enclosing a cylindrical volume therewith, a central flow divider disposed between said electrode surfaces and dividing the chamber into two compartments, a reactant supply port in said circumferential member and means providing communication with one of said compartments and a reactant exit port in said circumferential member communicating with the other said compartment, said divider including spiral flow means constructed and arranged to define an involute flow path.

11. The structure of claim 10 wherein the entrance to each of said involute paths is most remote from the reactant port communicating with that compartment.

12. The structure of claim 10 wherein said two compartments are substantially of equal volume and said involute flow path is of substantially constant cross-sectional area.

13. The structure of claim 10 wherein one of said spiral flow dividing means is righthanded and the other lefthanded.

14. An electrode structure comprising a pair of spaced walls one of said walls being a planar non-consumable gas permeable electrode, the other of said walls being non-gas permeable and having an opening substantially at its center, said pair of spaced walls constructed and arranged to partially define a closed reactant supply chamber having an inlet and an outlet port and to provide an involute flow path past the entire extent of said planar electrode from said inlet to said outlet port, one of said inlet and outlet ports being said opening in said non-gas permeable wall.

References Cited

UNITED STATES PATENTS

| | | | |
|---|---|---|---|
| 2,230,064 | 1/1941 | MacDougall et al. | 273—112 |
| 2,281,168 | 4/1942 | Paget | 165—66 |
| 3,146,131 | 8/1964 | Linden et al. | 136—86 |
| 3,259,524 | 7/1966 | Fay et al. | 136—86 |
| 3,354,000 | 11/1967 | Dengler et al. | 136—86 |
| 1,036,609 | 8/1912 | Grosvenor | 23—288 |
| 3,298,867 | 1/1967 | Diotalevi | 136—86 |
| 3,101,285 | 8/1963 | Tantram et al. | 136—86 |

ALLEN B. CURTIS, Primary Examiner

U.S. Cl. X.R.

136—120